Patented Jan. 5, 1926.

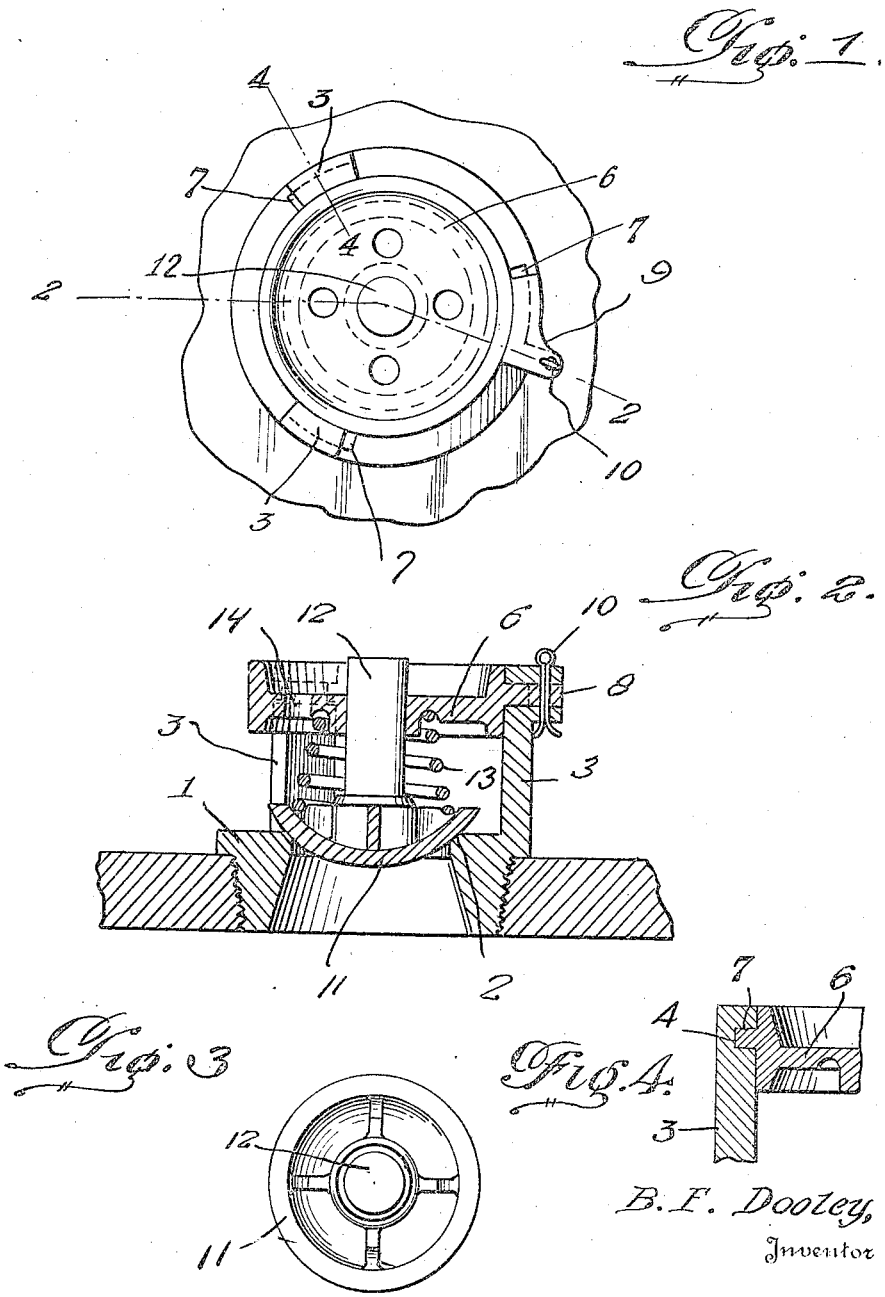

1,568,940

UNITED STATES PATENT OFFICE.

BENJAMIN F. DOOLEY, OF PORT ARTHUR, TEXAS.

VALVE.

Application filed September 18, 1924. Serial No. 738,521.

*To all whom it may concern:*

Be it known that I, BENJAMIN F. DOOLEY, a citizen of the United States, residing at Port Arthur, in the county of Jefferson and State of Texas, have invented certain new and useful Improvements in Valves, of which the following is a specification.

This invention relates to valve structures, and it consists in the novel features herein after described and claimed.

An object of the invention is to provide a valve structure of economical arrangement having its parts and features so arranged and assembled, that the valve proper will positively close against the seat, when subjected to back pressure, and wherein the valve member may effectually close against its seat, in the event that the axis thereof should assume a position out of proper alignment with respect to the valve opening and seat.

With the above object in view, the invention includes a casing provided with a seat and having a superstructure mounted thereon, which serves as a cage for the valve member, and also serves as means for resiliently holding the valve member toward its seat.

In the accompanying drawing:

Figure 1 is a top plan view of the valve structure.

Figure 2 is a sectional view thereof, cut on the line 2—2 of Figure 1.

Figure 3 is a top plan view of the valve member detached.

Figure 4 is a detail section taken substantially on the line 4—4 of Fig. 1.

The valve structure includes a body 1, having a port passing therethrough and provided with a seat 2. The body 1 also includes the three upstanding standards 3, which are provided at one side with notches 4. A plate 6 is provided at its periphery with lugs 7, which are adapted to engage in the notches 4. One of the lugs 7 is provided with an outstanding portion 8, which is adapted to engage under a corresponding outstanding portion 9 provided upon one of the standards 3, as best shown in Figure 1 of the drawings. A cotter pin 10 may be passed through the portions 9 and 8, as shown in Figure 2, and its ends may be spread in the usual manner, whereby the plate 6 is held at a fixed position with relation on the standards.

The valve member proper includes a bib 11, which is concavo-convex in transverse section and adapted to engage against the seat 2 of the body 1. The valve bib 11 is provided with a stem 12, which is slidably mounted through the center of the plate 6. A coil spring 13 of general conical configuration is interposed between the plate 6 and the valve member 11 and is under tension with a tendency to normally hold the said valve bib 11 in contact with the seat 2.

It will be seen that the portion 3 of the standards in conjunction with the plate 6, serve as a cage for the valve bib 11 and the spring 13.

Having described the invention, what is claimed is:

A valve structure comprising a body having a base provided with a port and a seat, a plurality of standards rising from the base and provided on the inner faces of their upper ends with notches, a plate having outstanding lugs adapted to engage within the notches, means for positively fixing the plate with relation to one of the standards, said plate having openings passing through the same transversely, a valve member interposed between the plate and the base of the body and having a stem which is slidably received in the plate, and a spring interposed between the plate and the valve member.

In testimony whereof I affix my signature.

B. F. DOOLEY.